(12) United States Patent
Schmitz (10) Patent No.: US 7,559,403 B2
(45) Date of Patent: Jul. 14, 2009

(54) MODULAR, CENTRAL FRAME, OFFSET, DUAL CONTROL ARM INDEPENDENT SUSPENSION AND SUSPENSION RETROFIT

(76) Inventor: Geoffrey W. Schmitz, 413 LaSalle St., Wausau, WI (US) 54403

( * ) Notice: Subject to any disclaimer, the term of this patent is extended or adjusted under 35 U.S.C. 154(b) by 0 days.

(21) Appl. No.: 11/399,063

(22) Filed: Apr. 5, 2006

(65) Prior Publication Data

US 2007/0235972 A1    Oct. 11, 2007

(51) Int. Cl.
*B60K 17/00* (2006.01)
(52) U.S. Cl. .................................. 180/344; 180/374
(58) Field of Classification Search .......... 280/124.134, 280/124.135, 124.136, 124.138, 124.142, 280/124.156, 663, 690, 124.139, 124.109; 180/21, 22, 24, 24.01, 24.04, 24.08, 24.09, 180/24.11, 24.12, 252, 253, 237, 238, 262, 180/337, 375, 377, 378, 357, 411, 414, 906, 180/233, 70 P, 248, 905, 701, 724, 312, 344, 180/374; 74/607, 606 R, 710.5, 714
See application file for complete search history.

(56) References Cited

U.S. PATENT DOCUMENTS

| 562,289 | A | | 6/1896 | Delion et al. |
| 844,615 | A | * | 2/1907 | Palmer ..................... 280/80.1 |
| 1,607,236 | A | * | 11/1926 | Bumstead ................... 180/210 |
| 1,704,296 | A | * | 3/1929 | Ledwinka ................... 180/14.4 |
| 1,731,962 | A | * | 10/1929 | Wright ....................... 180/362 |
| 1,737,915 | A | | 12/1929 | Carillo |
| 2,039,671 | A | | 5/1936 | Wagner |
| 2,075,585 | A | | 3/1937 | Martin |
| 2,163,981 | A | | 6/1939 | Lawrence |
| 2,278,303 | A | | 3/1942 | Blaser |
| 2,321,832 | A | | 6/1943 | Leighton |
| 2,631,044 | A | | 3/1953 | Booth |
| 2,833,366 | A | | 5/1958 | Olley |
| 2,846,234 | A | | 8/1958 | Steinkamp et al. |
| 2,858,142 | A | | 10/1958 | Schjolin |
| 2,968,358 | A | | 1/1961 | De Lorean |

(Continued)

FOREIGN PATENT DOCUMENTS

BE        557333        5/1957

(Continued)

*Primary Examiner*—Paul N Dickson
*Assistant Examiner*—Karen Jane Amores
(74) *Attorney, Agent, or Firm*—Patents + TMS, P.C.

(57) ABSTRACT

A dual control arm independent suspension mounts to a chassis of a high mobility truck for steering, non-steering, driving, and/or for non-driving. The dual control arm independent suspension has modular, tubular-frame and/or differential housing for attachment to front axle positions and/or to rear axle positions to simultaneously employ an upper control arm and a lower control arm. The upper control arm, the lower control arm and/or a half shaft position is offset and/or is staggered along a vehicle to minimize and/or to decouple a reaction of the dual control arm independent suspension from an excitement and/or a resonance. The dual control arm independent suspension is manufactured or is retrofitted to a manufactured swing-arm independent suspension chassis for utilizing an integral differential mount and/or an adapter plate. A modular dual control arm chassis provides tube sections and/or differential assemblies to be added or to be removed to support alternate vehicle configurations. The dual control arm independent suspension modifies differential mounted dual control arm independent suspension designs to accept a central tube frame member.

20 Claims, 5 Drawing Sheets

U.S. PATENT DOCUMENTS

| | | | |
|---|---|---|---|
| 2,988,161 A | | 6/1961 | Herr |
| 3,039,787 A | | 6/1962 | Meyer |
| 3,193,042 A | | 7/1965 | Brewer |
| 3,204,717 A | | 9/1965 | Collins |
| 3,209,852 A | | 10/1965 | Kozicki |
| 3,243,007 A | | 3/1966 | Berckhan |
| 3,283,842 A | * | 11/1966 | Watt ........................... 180/256 |
| 3,345,104 A | * | 10/1967 | Ulicki .................... 296/24.31 |
| 3,441,289 A | | 4/1969 | Frantz et al. |
| 3,471,166 A | * | 10/1969 | Clark ......................... 280/676 |
| 3,554,588 A | | 1/1971 | Reinsma et al. |
| 3,557,896 A | | 1/1971 | Mueller |
| 3,572,677 A | | 3/1971 | Damon |
| 3,630,303 A | | 12/1971 | Froumajou |
| 3,642,084 A | | 2/1972 | Takahashi |
| 3,703,215 A | | 11/1972 | Takahashi |
| 3,709,314 A | | 1/1973 | Hickey |
| 3,856,323 A | | 12/1974 | Arning et al. |
| 3,868,193 A | | 2/1975 | Schott |
| 3,903,831 A | | 9/1975 | Bartlett et al. |
| 3,951,222 A | | 4/1976 | Fletcher |
| 4,046,212 A | | 9/1977 | Hansen |
| 4,057,120 A | | 11/1977 | Roethlisberger |
| 4,172,621 A | | 10/1979 | Yoshida |
| 4,175,771 A | | 11/1979 | Muzechuk et al. |
| 4,190,378 A | | 2/1980 | Stecklein |
| 4,200,165 A | | 4/1980 | Bowman, Jr. et al. |
| 4,207,956 A | * | 6/1980 | McColl ........................ 180/24 |
| 4,235,300 A | | 11/1980 | Capjon |
| 4,263,980 A | | 4/1981 | Harlow, Jr. et al. |
| 4,271,922 A | | 6/1981 | Kishline |
| 4,274,655 A | | 6/1981 | Lederman |
| 4,282,949 A | | 8/1981 | Kopich et al. |
| 4,313,518 A | * | 2/1982 | Ledwinka et al. ........... 180/233 |
| 4,368,050 A | | 1/1983 | Peterson |
| 4,369,854 A | | 1/1983 | Butterworth |
| RE31,184 E | | 3/1983 | Lederman |
| 4,383,589 A | | 5/1983 | Fox |
| 4,400,007 A | | 8/1983 | Ingalls |
| 4,456,277 A | | 6/1984 | Carpenter |
| 4,485,662 A | | 12/1984 | Justice |
| 4,518,368 A | | 5/1985 | Peretti |
| 4,545,600 A | | 10/1985 | Mullet |
| 4,545,601 A | | 10/1985 | Mullet et al. |
| 4,550,926 A | | 11/1985 | MacIsaac |
| 4,557,469 A | | 12/1985 | Jeglitzka et al. |
| 4,561,640 A | | 12/1985 | Enke et al. |
| 4,577,534 A | | 3/1986 | Rayne |
| 4,583,614 A | | 4/1986 | Knight |
| 4,596,299 A | | 6/1986 | Krude |
| 4,613,009 A | | 9/1986 | Nakamura et al. |
| 4,650,029 A | | 3/1987 | Foote et al. |
| 4,669,571 A | | 6/1987 | Krude |
| 4,693,491 A | | 9/1987 | Akatsu et al. |
| 4,714,270 A | | 12/1987 | Rumpel |
| 4,738,466 A | | 4/1988 | Mikina |
| 4,810,002 A | | 3/1989 | Kakimoto et al. |
| 4,813,507 A | | 3/1989 | Tanaka et al. |
| 4,813,704 A | | 3/1989 | Smith |
| 4,826,203 A | | 5/1989 | Kijima et al. |
| 4,848,789 A | * | 7/1989 | Timoney et al. ...... 280/124.139 |
| 4,867,260 A | | 9/1989 | Cameron et al. |
| 4,881,752 A | | 11/1989 | Tanaka |
| 4,887,927 A | | 12/1989 | Bond |
| 4,898,018 A | | 2/1990 | Ventress |
| 4,943,081 A | | 7/1990 | Golpe |
| 4,989,894 A | | 2/1991 | Winsor |
| 5,004,257 A | | 4/1991 | MacIsaac |
| 5,062,654 A | | 11/1991 | Kakimoto et al. |
| 5,197,755 A | | 3/1993 | Quick |
| 5,240,280 A | | 8/1993 | Raidel |
| 5,312,199 A | | 5/1994 | Smith, Jr. |
| 5,402,859 A | | 4/1995 | Boberg et al. |
| 5,538,264 A | | 7/1996 | Brown et al. |
| 5,538,274 A | | 7/1996 | Schmitz et al. |
| 5,560,638 A | | 10/1996 | Lee |
| 5,755,456 A | | 5/1998 | Blazek et al. |
| 5,820,150 A | | 10/1998 | Archer et al. |
| 5,915,727 A | | 6/1999 | Bonnville |
| 5,931,486 A | * | 8/1999 | Andreis ............... 280/124.139 |
| 6,105,984 A | | 8/2000 | Schmitz et al. |
| 6,148,945 A | * | 11/2000 | Alessandro et al. ......... 180/256 |
| 6,470,991 B1 | * | 10/2002 | Bowman et al. ............ 180/312 |
| 6,491,129 B1 | | 12/2002 | Young et al. |
| 6,516,914 B1 | | 2/2003 | Anderson et al. |
| 6,520,494 B1 | | 2/2003 | Anderson et al. |
| 6,561,718 B1 | | 5/2003 | Archer et al. |
| 6,695,329 B2 | | 2/2004 | Handa |
| 6,733,021 B1 | | 5/2004 | Ziech et al. |
| 6,752,235 B1 | | 6/2004 | Bell et al. |
| 6,752,411 B2 | | 6/2004 | Few |
| 6,764,085 B1 | | 7/2004 | Anderson |
| 6,779,623 B2 | | 8/2004 | Woods et al. |
| 6,789,812 B2 | | 9/2004 | Peterson |
| 6,827,176 B2 | * | 12/2004 | Bean et al. ................... 180/411 |
| 6,905,130 B2 | | 6/2005 | Few |
| 6,915,873 B2 | | 7/2005 | Woods et al. |
| 6,997,467 B2 | | 2/2006 | Dean |
| 7,207,408 B2 | * | 4/2007 | Kuroki et al. ............... 180/210 |
| 7,287,621 B2 | * | 10/2007 | Kuroki et al. ............... 180/374 |
| 7,325,821 B2 | * | 2/2008 | Myers et al. .......... 280/124.156 |
| 2003/0110885 A1 | * | 6/2003 | Beutler ..................... 74/606 R |
| 2004/0129491 A1 | * | 7/2004 | Bean et al. ................... 180/411 |
| 2004/0144591 A1 | * | 7/2004 | Kuroki et al. ............... 180/337 |
| 2007/0246286 A1 | * | 10/2007 | Henze ....................... 180/349 |
| 2008/0258417 A1 | * | 10/2008 | Cordier ............... 280/124.109 |

FOREIGN PATENT DOCUMENTS

| | | |
|---|---|---|
| CA | 630465 | 11/1961 |
| DE | 1045253 | 11/1958 |
| DE | 1455590 | 4/1969 |
| DE | 3136305 | 3/1983 |
| EP | 0239449 A1 | 9/1987 |
| EP | 0278095 A1 | 8/1988 |
| EP | 0287278 A1 | 10/1988 |
| EP | 546609 | 6/1993 |
| EP | 0287278 B1 | 7/1993 |
| EP | 0410675 B1 | 12/1993 |
| EP | 1164074 A2 | 12/2001 |
| FR | 1051204 | 1/1954 |
| FR | 2221294 | 10/1974 |
| FR | 2571313 | 4/1986 |
| GB | 218114 | 7/1924 |
| GB | 429596 | 5/1935 |
| GB | 526480 | 9/1940 |
| GB | 652432 | 4/1951 |
| GB | 673931 | 6/1952 |
| GB | 947853 | 1/1964 |
| GB | 978608 | 12/1964 |
| GB | 1020671 | 2/1966 |
| GB | 1194988 | 6/1970 |
| GB | 1222850 | 2/1971 |
| GB | 1286229 | 8/1972 |
| GB | 2147553 A | 5/1985 |
| GB | 2230237 A | 10/1990 |
| GB | 2277304 A | 10/1994 |
| JP | 2001-140964 | 5/2001 |

* cited by examiner

MODULAR, CENTRAL FRAME, OFFSET, DUAL CONTROL ARM INDEPENDENT SUSPENSION AND SUSPENSION RETROFIT

BACKGROUND OF THE INVENTION

The present invention generally relates to modular, central-frame, offset, dual control arm independent suspension and suspension retrofit. More specifically, the present invention relates to modular, central-frame, offset, dual controlarm independent suspension and suspension retrofit which may be incorporated into and/or may be attached to an independent suspension vehicle. The dual control-arm independent suspension may be fixed to and/or may be attached to the central tubular frame. Control-arm pivot positions may be integral to a centrally mounted differential housing to permit an upper control arm geometry and/or a lower control arm geometry relative to the central tubular frame. An integral jounce and/or a rebound stop may be located within the centrally mounted differential housing to support a cargo body and/or an upper vehicle structure. Alternatively, a frame mounted jounce limiter may be located along a space frame fixed to a suspension tube to support the cargo body and/or the upper vehicle structure.

A power transmission may be located within the central tubular frame for providing power transmitting shafts from the transmission to the axle units and/or the suspension units. Wheel positions and/or control arm geometries may be offset from a first side to a second side along a length of the independent suspension vehicle. The dual control arm independent suspension may have spring elements attachable to central tubular frame, to an accessory frame and/or to the differential housing. A joint and/or an angular power transmission element may be attached to an outboard end of a centrally pivoted axle driveshaft to accommodate extension or compression of a half shaft during suspension travel. A knuckle and/or a wheel planetary assembly with or without final drive reduction may be attached to the dual control arm independent suspension. The wheel assembly may provide and/or may be attachable to components, such as, for example, outboard control arm pivots, a steering arm, a spindle, wheel bearings, a brake spider and/or brake elements.

It is generally known that a vehicle manufacturer provides a central tube to form a structural frame of a vehicle and/or a backbone to support a swing arm vehicle suspension. The central tube provides a protective housing for power transmitting shafts and/or drive-train elements. Typically, flanged tubular frame sections of the central tube are fastened to mate with axially centered differential housings. Swing arms of the swing arm vehicle suspension pivot with respect to a center axis of the differential housing to protrude at right angles with respect to the differential housings. As a result, an offset is provided across a width of the vehicle to drive opposing output shaft pinions from an axially mounted differential ring gear. A dual control arm independent suspension is attachable to the differential housings below a ladder-type structural frame of the vehicle. As a result, control arms and/or half shaft geometry of the dual control arm independent suspension locate and/or provide a symmetric tire contact patch across the width of the vehicle.

However, the swing arm vehicle suspension has limited kinematic possibilities. For example, the swing arm vehicle suspension provides geometry forces of a wheel and/or a tire to travel through a circular arc with simultaneously changing a tire camber angle and/or a tire contact patch location via a suspension motion. Changes in camber angle and/or tire contact patch location during suspension trave is an undesirable characteristic which results in poor handling, excessive tire-wear or a "jacking" and/or a lifting of the vehicle body upward while negotiating curves. Further, a suspension element of the swing arm vehicle suspension must be fixed to a central structure which prevents dual control arm independent suspension elements from being incorporated into the swing arm vehicle suspension.

A need, therefore, exists for modular, central-frame, offset, dual control arm independent suspension and suspension retrofit. Additionally, a need exists for modular, central frame, offset, dual control arm independent suspension and suspension retrofit which may provide elements of a tubular frame chassis to maximize kinematic possibilities and/or to improve handling and/or wheel travel properties of the dual control arm independent suspensions. Further, a need exists for modular, central frame, offset, dual control arm independent suspension and suspension retrofit which may provide a suspension and/or a chassis to negotiate rough terrain at high speeds with improved ride comfort and/or safety while remaining within legal parameters and/or suspension performance parameters. Still further, a need exists for modular, central frame, an offset, dual control arm independent suspension and suspension retrofit which may provide an integral central protective housing for power transmitting shafts and/or drive train elements via the central frame.

SUMMARY OF THE INVENTION

The present invention generally relates to modular, central frame, offset, dual control arm independent suspension and suspension retrofit. More specifically, the present invention relates to modular, central frame, offset, dual control arm independent suspension and suspension retrofit which may be incorporated into and/or may be attached to an independent suspension vehicle. The dual control arm independent suspension may be fixed to and/or may be attached to the central tubular frame. An integral jounce and/or a rebound stop may be located within the central mounted differential housing to support a cargo body and/or an upper vehicle structure. A power transmission may be located within the central tubular frame for providing power transmitting shafts from the transmission to the axle units and/or the suspension units. Wheel positions and/or control arm geometries may be offset from a first side to a second side along a length of the independent suspension vehicle. A joint and/or an angular power transmission element may be attached to an outboard end of a centrally pivoted axle driveshaft to accommodate extension or compression of a half shaft during suspension travel.

To this end, in an embodiment of the present invention, a dual control arm suspension for moving a tire wherein drive elements are connected to the tire wherein the drive elements move the tire is provided. The dual control arm suspension has a housing having a length defined between a first end and a second end wherein the housing has walls defining an interior. Further, the dual control arm suspension has a first plate having a width defined between a first side and a second side wherein the first plate is connected to the first side of the housing wherein the first plate has a pivot which extends outwardly with respect to the walls of the housing wherein a passage is formed in the pivot of the first plate wherein the passage extends from the first side through the first plate to the second side of the first plate. Still further, the dual control arm suspension has a first arm having a length defined between a first end and a second end wherein the pivot of the first plate is inserted into the first end of the first arm wherein the first arm is connected to the plate. Moreover, the dual control arm suspension has a shaft connected to the housing wherein the shaft extends from the interior of the housing outwardly with respect to the second end of the first arm wherein the shaft moves the tire wherein the first arm rotates with respect to the housing via the pivot.

In an embodiment, the dual control arm suspension has a bearing connected to the second end of the first arm wherein the bearing connects the first arm to the tire.

In an embodiment, the dual control arm suspension has a tube connected to the housing wherein the first shaft is driven via the tube.

In an embodiment, the dual control arm suspension has a joint attached to the shaft wherein the joint connects the shaft to the tire.

In an embodiment, the dual control arm suspension has a second arm attached to first plate wherein the second arm connects the plate and the tire.

In an embodiment, the first arm is fork-shaped.

In an embodiment, the dual control arm suspension has a second plate connected to the first arm and the second end of the housing wherein the second plate is located between the housing and the first arm.

In an embodiment, the dual control arm suspension has a stopper formed on the first plate wherein the stopper prevents the first arm from rotating with respect to the housing.

In another embodiment of the present invention, a frame for moving a vehicle wherein a transmission is connected to the frame for moving the vehicle is provided. The frame has a first tire having a first axis wherein a hub is located within the first tire and a first dual control arm suspension connected to the hub of the first tire wherein the tire is suspended by the first dual control arm suspension. Further, the frame has a first differential housing having a length defined between a first end and a second end wherein the first differential housing has walls defining an interior wherein the first dual control arm suspension is connected to the first end and the second end of the first differential housing. Moreover, the frame has a second tire connected to the first differential housing wherein the second tire has a second axis wherein the first axis of the first tire is offset a distance with respect to the second axis of the second tire wherein the differential housing transmits a torque force to the first tire to move the tire.

In an embodiment, the frame has a plate connected to the first end or the second end of the differential housing wherein the plate is located between the first dual control arm suspension and the first differential housing.

In an embodiment, the frame has a second dual control arm suspension connected to the second tire and the first differential housing wherein the second dual control arm suspension is located between the second tire and the first differential housing.

In an embodiment, the frame has a second differential housing connected to the first differential housing wherein the torque force is transmitted to the first differential housing via the second differential housing.

In an embodiment, the frame has a tube connected to the interior of the first differential housing wherein the torque force is transmitted to the first differential housing via the tube.

In an embodiment, the frame has shafts connected to the first differential housing wherein each of the shafts are offset by the distance between the first axis of the first tire and the second axis of the second tire.

In another embodiment of the present invention, a retrofit suspension system for connecting a dual control arm suspension to a frame is provided. The retrofit suspension system has a housing having a length defined between a first end and a second end wherein the housing has walls defining an interior wherein the housing has a first shaft and a second shaft extending from the interior of the housing outwardly with respect to the walls of the housing wherein the first shaft or the second shaft move the frame wherein the first shaft is offset a distance with respect to the second shaft. Further, the retrofit suspension system has a first plate connected to the housing wherein the first plate has a width defined between a first side and a second side wherein a passage is formed in the first plate wherein the passage extends from the first side through the first plate to the second side of the plate. Still further, the retrofit suspension system has a first dual control arm suspension connected to the housing via the passage of the first plate wherein the first arm rotates to a first angle with respect to the housing wherein the first dual control arm suspension reduces a vibration caused from moving the frame. Moreover, the retrofit suspension system has a first stopper connected to the housing wherein the first stopper prevents the first arm from rotating to a second angle greater than the first angle with respect to the housing.

In an embodiment, the retrofit suspension system has a second plate connected to the housing wherein the first dual control arm suspension is connected to the first end of the housing via the first plate and the second plate.

In an embodiment, the retrofit suspension system has a second plate connected to the housing wherein the second plate connects the first dual control arm suspension to the housing.

In an embodiment, the retrofit suspension system has a second dual control arm suspension attached to the housing wherein the second dual control arm suspension reduces the vibration caused from moving the frame in the direction.

In an embodiment, the retrofit suspension system has a spring connected to the first dual control arm suspension wherein the spring reduces the vibration caused from moving the frame.

In an embodiment, the retrofit suspension system has a second stopper connected to the housing wherein the stopper contacts the first dual control arm suspension.

It is, therefore, an advantage of the present invention to provide a modular, central frame, offset, dual control arm independent suspension and suspension retrofit.

Another advantage of the present invention is to provide a modular, central frame, offset, dual control arm independent suspension and suspension retrofit which may eliminate problems associated with swing arm suspension and/or may improve durability, rigidity and/or modularity associated with a dual control arm suspension.

Yet another advantage of the present invention is to provide a modular, central frame, offset, dual control arm independent suspension and suspension retrofit which may provide the dual control arm independent suspension for exhibiting a high wheel travel, a low frequency, a near-vertical wheel travel and/or a low spring rate.

Still another advantage of the present invention is to provide a modular, central frame, offset, dual control arm independent suspension and suspension retrofit which may provide a low rate suspension to improve a wheel-to-terrain compliance and/or to minimize energy induced into a vehicle frame, an operator, passengers and/or a cargo.

A further advantage of the present invention is to provide a modular, central frame, offset, dual control arm independent suspension and suspension retrofit which may provide a dual control arm suspension for employing a modular center tube to permit adding tube and differential units for forming a plurality of vehicle configurations.

Yet another advantage of the present invention is to provide a modular, central frame, offset, dual control arm independent suspension and suspension retrofit which may provide a modular construction having interchangeable components from a left side to a right side and/or between axle positions.

A still further advantage of the present invention is to provide a modular, central frame, offset, dual control arm independent suspension and suspension retrofit which may provide a method for attaching and/or for retrofitting a dual control independent suspension to a central tube mounted swing arm chassis.

Moreover, an advantage of the present invention is to provide a modular, central frame, offset, dual control arm independent suspension and suspension retrofit which may provide a dual control arm independent suspension employable as a driven axle and/or as a non-driving axle.

And another advantage of the present invention is to provide a modular, central frame, offset, dual control arm independent suspension and suspension retrofit which may provide a dual control arm independent suspension employable as a steering axle and/or as a non-steering axle.

Yet another advantage of the present invention is to provide a modular, central frame, offset, dual control arm independent suspension and suspension retrofit which may provide a dual control arm independent suspension employable as a front axle and/or as a rear axle.

Another advantage of the present invention is to provide a modular, central frame, offset, dual control arm independent suspension and suspension retrofit which may provide a suspension construction to provide integral positive travel stops and/or external positive travel stops in multiple planes of a dual control arm suspension travel, for example, such as, jounce and/or rebound.

Yet another advantage of the present invention is to provide a modular, central frame, offset, dual control arm independent suspension and suspension retrofit which may provide a suspension construction to avoid over-extension and/or of the suspension construction for connecting a shaft, springs and/or components.

A still further advantage of the present invention is to provide a modular, central frame, offset, dual control arm independent suspension and suspension retrofit which may provide a suspension construction to permit a vehicle to be suspended in flight and/or compressed downward without damaging suspension components.

Moreover, an advantage of the present invention is to provide a modular, central frame, offset, dual control arm independent suspension and suspension retrofit which may provide a suspension to integrate primary suspension and second suspension vibration dampening, roll control and/or control devices, such as, for example, oil filled shock absorbers, gas filled shock absorbers, anti-roll bars, active suspension elements, semi-active dampening devices, active dampening elements, operator controlled dampening, magnetorheological devices, electrorhelogical devices, elastomeric dampers and/or the like.

And, another advantage of the present invention is to provide a modular, central frame, offset, dual control arm independent suspension and suspension retrofit which may provide a dual control arm suspension and a chassis arrangement to reduce a frontal area for minimizing a motion resistance in a terrain, such as, for example, soft soils, mud, sand, snow, water and/or the like.

Yet another advantage of the present invention is to provide a modular, central frame, offset, dual control arm independent suspension and suspension retrofit which may minimize a chassis compliance to a conventional frame construction with a torsionally rigid central tube frame for the dual control arm independent suspension.

Another advantage of the present invention is to provide a modular, central frame, offset, dual control arm independent suspension and suspension retrofit which may provide a suspension and a chassis to attach to vehicles for employing combinations and/or numbers of driving axles and/or non-driving axles.

Yet another advantage of the present invention is to provide a modular, central frame, offset, dual control arm independent suspension and suspension retrofit which may provide a control arm attachment integral with a differential housing attachable to endplates and/or existing swing arm suspensions designs or retrofitted to an existing swing arm suspension vehicle via an adapter plate located along the differential housing and/or a backbone tube.

A still further advantage of the present invention is to provide a modular, central frame, offset, dual control arm independent suspension and suspension retrofit which may provide a tube without a circular cross-sectional frame member to improve ground clearance, vehicle integration, attachment and/or strength.

Moreover, an advantage of the present invention is to provide a modular, central frame, offset, dual control arm independent suspension and suspension retrofit which may provide a tube without a circular cross-sectional frame member to reduce resistance to motion and/or to drag.

And, another advantage of the present invention is to provide a modular, central frame, offset, dual control arm independent suspension and suspension retrofit which may provide a tube having a non-circular cross-sectional shape, such as, for example, oval, square, rectangular, triangular, boat-hull shaped, tapered, non-symmetrical and/or the like.

Yet another advantage of the present invention is to provide a modular, central frame, offset, dual control arm independent suspension and suspension retrofit which may have two or more axles at symmetrical wheel base spacings or at non-symmetrical wheel base spacings along a length of a vehicle by changing a modular frame tube length between differentials.

Another advantage of the present invention is to provide a modular, central frame, offset, dual control arm independent suspension and suspension retrofit which may offset a control arm position, a geometry, a shape and/or a half shaft location to accommodate a symmetric tire patch relationship or an asymmetric tire patch relationship.

Yet another advantage of the present invention is to provide a modular, central frame, offset, dual control arm independent suspension and suspension retrofit which may accommodate a first spring element in parallel or in series with a second spring element, such as, for example, a hydropneumatic strut, an air spring, a torsion bar, a leaf spring, a pivoted leaf spring, an air bag, a permanent magnet, an electro-magnet, a linear electric motor, a hydraulic cylinder, an air cylinder, an elastomeric spring, a rubber block, a compressible fluid device, an active suspension element and/or the like.

A still further advantage of the present invention is to provide a modular, central frame, offset, dual control arm independent suspension and suspension retrofit which may permit a single wheel application and/or a dual wheel application on a single axle end to maintain a planar ground contact along a tire set with near vertical wheel travel via the dual control arm independent suspension.

Moreover, an advantage of the present invention is to provide a modular, central frame, offset, dual control arm independent suspension and suspension retrofit which may provide an asymmetrical tire contact patch orientation for decoupling suspension action and/or to reduce susceptibility to resonance by offsetting a suspension with a control arm geometry locating dual control arm suspension elements.

And, another advantage of the present invention is to provide a modular, central frame, offset, dual control arm independent suspension and suspension retrofit which may provide a dual control arm independent suspension with an enclosed drive-line to prevent damage from natural elements, from improved lubrication, from lubricant retention, from improved component life and/or the like.

Yet another advantage of the present invention is to provide a modular, central frame, offset, dual control arm independent suspension and suspension retrofit which may provide a suspension frame geometry to permit placing a backbone housing between differential-mounted dual control arm suspension designs.

Another advantage of the present invention is to provide a modular, central frame, offset, dual control arm independent suspension and suspension retrofit which may provide conventionally mounted independent dual control arm suspensions with advantages of a tubular central frame construction and/or with an ability to modify or to retrofit suspensions with a modular central tube.

Yet another advantage of the present invention is to provide a modular, central frame, offset, dual control arm independent suspension and suspension retrofit which may apply a tube chassis design to a straight-frame vehicle and/or to a articulated-frame vehicle by adding an articulation joint in a tubular frame between a front vehicle section and a rear vehicle section.

A still further advantage of the present invention is to provide a modular, central frame, offset, dual control arm independent suspension and suspension retrofit which may increase a roll stiffness, an accompaniment of multiple suspension types and/or an available wheel travel in a vehicle equipped with swing arm independent suspensions by conversion or by retrofitting with a dual control-arm independent suspension.

Moreover, an advantage of the present invention is to provide a modular, central frame, offset, dual control arm independent suspension and suspension retrofit which may convert and/or may retrofit a vehicle equipped having a swing arm independent suspensions with dual control arm independent suspensions for reducing a load sensitivity, a wheel chamber change, a track wide change, a jacking, a sensitivity to bump-steer, a tire wear due to scuffing and/or a ride height of the vehicle.

And, another advantage of the present invention is to provide a modular, central frame, offset, dual control arm independent suspension and suspension retrofit which may permit the use of high horsepower engines, large transmissions, drive components and/or engine components, such as, for example, cylinder engines.

Yet another advantage of the present invention is to provide a modular, central frame, offset, dual control arm independent suspension and suspension retrofit which may provide the dual control arm independent suspension and a central tube geometry to increase flexibility in selecting an engine component, a transmission component and a drive line component by increasing available width without interference with a ladder type frame.

Another advantage of the present invention is to provide a modular, central-frame, offset, dual control-arm independent suspension and suspension retrofit which may provide a suspension with a control arm geometry locating dual control arm suspension elements for reducing susceptibility to traction hop encountered during vehicle operation with negotiating, for example, vertical grades, dry loose soils, under draw bar loads and/or the like.

Yet another advantage of the present invention is to provide a modular, central frame, offset, dual control arm independent suspension and suspension retrofit which may offset a control arm geometry locating dual control arm suspension elements to provide an asymmetrical tire patch relationship for decoupling suspension action and/or resonant behavior of a suspension for applying to a backbone mounted suspension and/or a ladder frame mounted suspension.

A still further advantage of the present invention is to provide a modular, central frame, offset, dual control arm independent suspension and suspension retrofit which may permit a single wheel application and/or a dual wheel application on a single axle end to maintain a planar ground contact along a tire set with near-vertical wheel travel via a dual control arm independent suspension.

Moreover, an advantage of the present invention is to provide a modular, central frame, offset, dual control arm independent suspension and suspension retrofit which may provide an asymmetrical tire contact patch orientation for decoupling suspension action and/or for reducing susceptibility to resonance by offsetting a suspension with control arm geometry locating dual control arm suspension elements.

And, another advantage of the present invention is to provide a modular, central frame, offset, dual control arm independent suspension and suspension retrofit which may eliminate interference between an upper control arm and a bottom frame assembly experienced in ladder frame applications to permit a low vehicle body, a low center of gravity of a vehicle and/or a low height of the vehicle.

Yet another advantage of the present invention is to provide a modular, central frame, offset, dual control arm independent suspension and suspension retrofit which may permit a strong efficient control arm geometry without forming an upper control arm to avoid a frame interference.

Another advantage of the present invention is to provide a modular, central frame, offset, dual control arm independent suspension and suspension retrofit which may increase a stability of a vehicle based on a center of gravity for the vehicle and/or may increase a vertical clearance of the vehicle based on a suspension height of the vehicle.

Yet another advantage of the present invention is to provide a modular, central frame, offset, dual control arm independent suspension and suspension retrofit which may provide the dual control arm independent suspension with a central tube design for locating control arm pivots of a control arm geometry for reducing a vertical wheel travel, a track width change, a change in camber angle and/or a sensitivity to bump steer.

A still further advantage of the present invention is to provide a modular, central frame, offset, dual control arm independent suspension and suspension retrofit which may provide a central tube design to permit free exchange of fluids within the central tube as a reservoir for hydraulic oil, lubricating oil and/or fluids.

Moreover, an advantage of the present invention is to provide a modular, central frame, offset, dual control arm independent suspension and suspension retrofit which may provide a suspension and an axle with or without a planetary drive or a final drive in a wheel end.

And, another advantage of the present invention is to provide a modular, central frame, offset, dual control arm independent suspension and suspension retrofit which may provide a central tube dual control arm independent suspension without a ladder-type supporting structure for reducing a weight associated with a space frame design.

Yet another advantage of the present invention is to provide a modular, central frame, offset, dual control arm independent suspension and suspension retrofit which may prevent damage to components contained inside a central tube from a mine blast, an indirect weapons fire, a direct weapons fire and/or the like.

Another advantage of the present invention is to provide a modular, central frame, offset, dual control arm independent suspension and suspension retrofit which may provide vehicle components which may be attached directly or indirectly to a central tube member.

Yet another advantage of the present invention is to provide a modular, central frame, offset, dual control arm independent suspension and suspension retrofit which may provide a central tube with integral jounce stops or rebound stops to eliminate a ladder-type frame or a support structure supported over a backbone assembly.

A still further advantage of the present invention is to provide a modular, central frame, offset, dual control arm independent suspension and suspension retrofit which may eliminate inter-axle, Hooke-Cardan joints associated with a ladder frame construction to increase a reliability and/or maintenance intervals of a vehicle.

Moreover, an advantage of the present invention is to provide a modular, central frame, offset, dual control arm independent suspension and suspension retrofit which may provide a dual control arm independent suspension design with a rigid central tube for permitting a placement of drive components into a vehicle drive line to eliminate external shafts and/or rotating angular joints, such as, CV joints, Hooke-Cardan joints and/or the like.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a modular, central frame, offset, dual control arm independent suspension and suspension retrofit. More specifically, the present invention relates to a modular, central-frame, offset, dual control-arm independent suspension and suspension retrofit which may be incorporated into and/or may be attached to an independent suspension vehicle for steering and for non-steering and/or for driving and for non-driving. The dual control arm independent suspension may provide an upper control arm and/or a lower control arm which may simultaneously pivot with respect to differential housings. The upper control arm and/or the lower control arm may be mounted to a modular tube chassis and/or to a hub and/or a final drive assembly for supporting a wheel and/or a tire. The upper control arm and/or the lower control arm may be located in an offset configuration or a staggered configuration along a length of the independent suspension vehicle for minimizing and/or decoupling a dual control arm suspension reaction from simultaneous excitement, near-simultaneous excitement and/or resonance.

The independent suspension vehicle may be manufactured with and/or may be retrofitted to receive and/or to provide the dual control arm independent suspension via integral differential mounts, adapter plates, a differential/frame tube mounting flange and/or a fixed modular tube. A modular, dual control arm chassis may provide tube sections and/or differential assemblies for adding and/or for removing to support alternate configurations of the independent suspension vehicle. The central frame may receive and/or may attach to a differential housing for modifying and/or for mounting the dual control arm independent suspension to the independent suspension vehicle.

Figure 1:
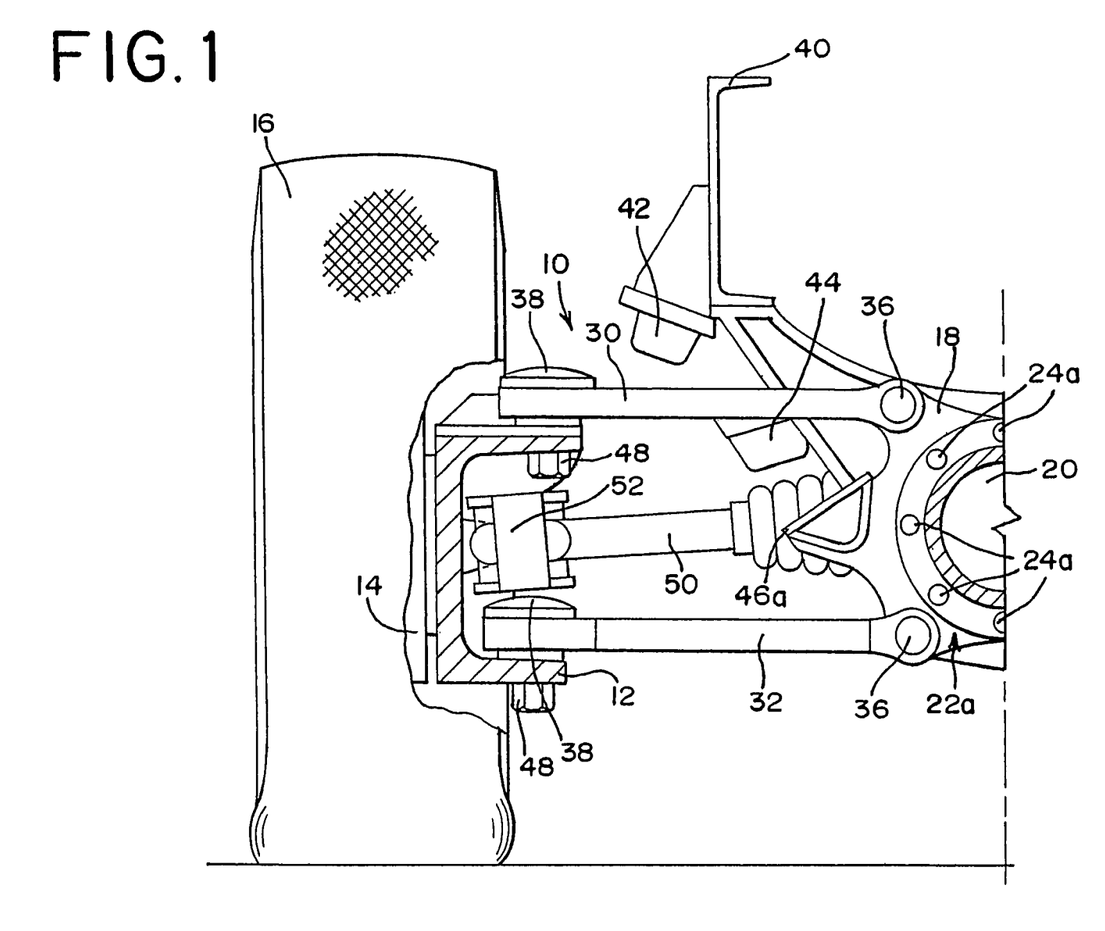
FIG. 1 illustrates a partial front plan view of a dual control arm independent suspension attachable to a hub and a tire in an embodiment of the present invention.
Figure 2:
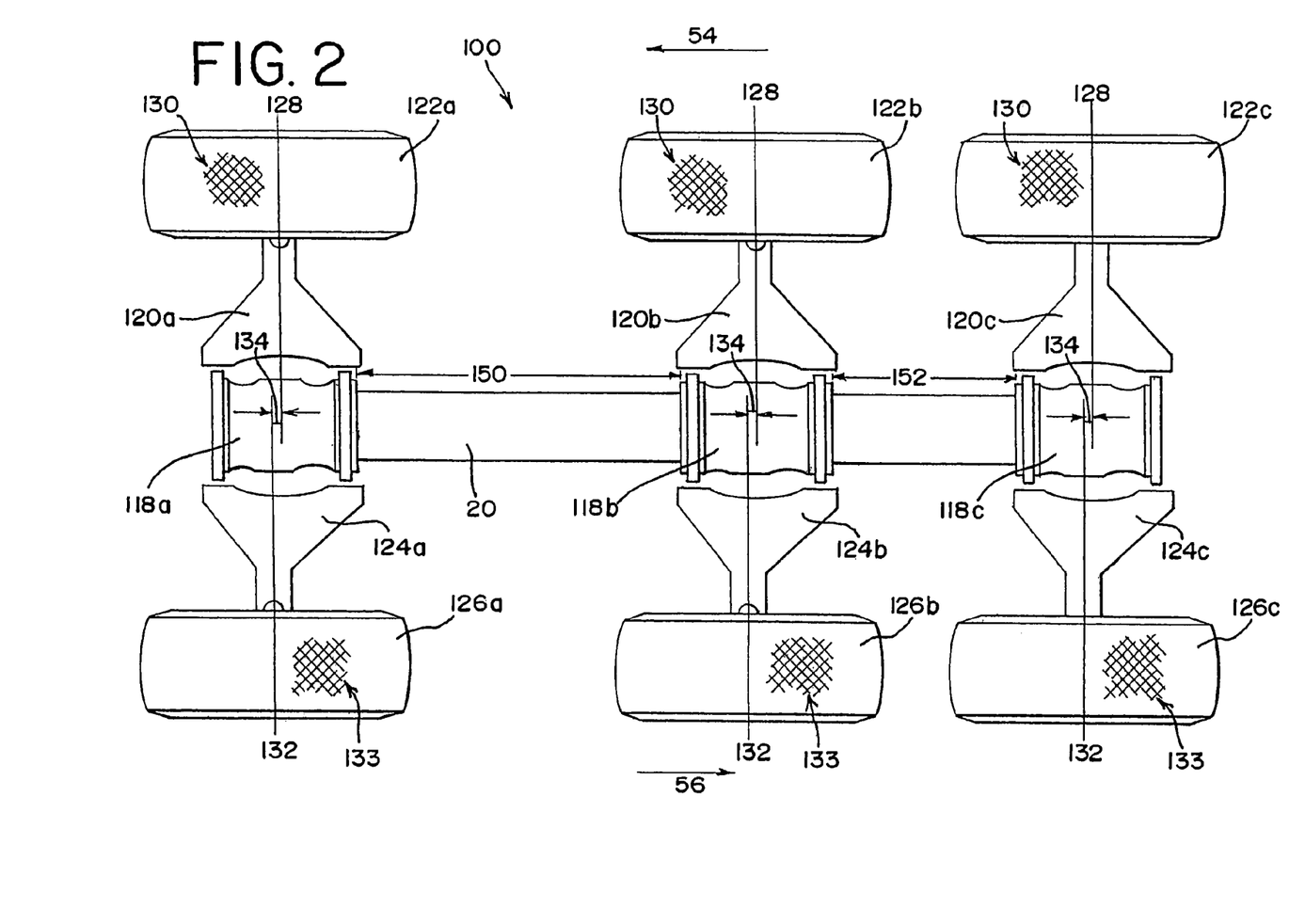
FIG. 2 illustrates a top plan view of a central frame with offset attachable to hubs and tires in an embodiment of the present invention.
Figure 3:
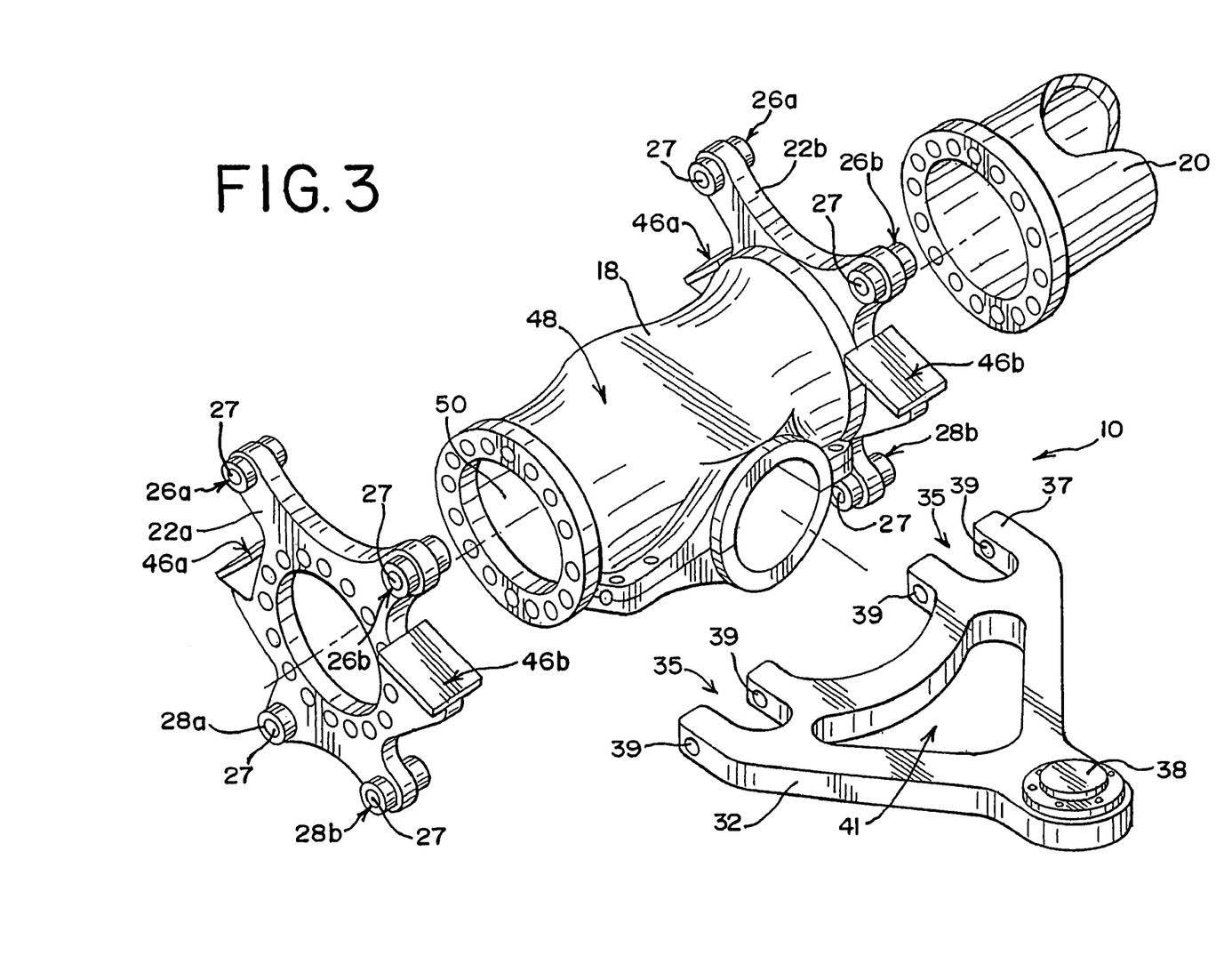
FIG. 3 illustrates an exploded perspective view of a differential housing with a control arm in an embodiment of the present invention.

Referring now to the drawings wherein like numerals refer to like parts, FIGS. 1-3 illustrate a dual control arm independent suspension 10 (hereinafter "the dual control arm suspension 10") which may be attachable to a knuckle 12, a hub 14 and/or a tire 16 of a vehicle (not shown in the figures) in an embodiment of the present invention. The vehicle may be, for example, a high-mobility truck, a military vehicle, a passenger vehicle and/or the like. The dual control arm suspension 10 may have a differential housing 18 (hereinafter "the housing 18") for attaching a central tube 20 (hereinafter "the tube 20"), as shown in FIGS. 1 and 2. The knuckle 12 may be, for example, a steering knuckle or a non-steering knuckle. The present invention should not be deemed as limited to a specific embodiment of the vehicle. It should be understood that any number of knuckles, hubs, tires and/or housings may be attached to and/or may be incorporated into the vehicle as known to one of ordinary skill in the art.

In an embodiment, the hub 14 and/or the tire 16 may be referred to as a final drive reduction 14, 16. A drive component (not shown in the figures) may be attachable to the knuckle 12 and/or the final drive reduction 14, 16. The drive component may be, for example, outboard control arm pivots, a steering arm, a spindle, wheel bearings, a brake spider, brake elements hub and/or the like. The present invention should not be deemed as limited to a specific embodiment of the drive component.

A first pivot plate 22a and/or a second pivot plate 22b (collectively known hereinafter as "the pivot plates 22a, 22b") may be attached to the housing 18 with one or more fasteners 24 for attaching and/or for connecting the pivot plates 22a, 22b to the tube 20. In an embodiment, eight of the fasteners 24 may attach and/or may connect the pivot plates 22a, 22b to the housing 18. In an embodiment, eighteen of the fasteners 24 may attach and/or may connect the pivot plates 22a, 22b to the housing 18. The housing 18 may be located between the pivot plates 22a, 22b. The pivot plates 22a, 22b may be located between the tube 20 and the housing 18, as shown in FIGS. 2 and 3. The fasteners 24 may be, for example, bolts, dowels, screws, posts, pins, shafts, rods, welds and/or the like. The fasteners 24 may be any fastener which may attach the pivot plates 22a, 22b to the housing 18 as known to one of ordinary skill in the art.

The pivot plates 22a, 22b may have and/or may provide top control arm pivots 26a, 26b and/or bottom control arm pivots 28a, 28b as shown in FIG. 1. The top control arm pivots 26a, 26b and/or the bottom control arm pivots 28a, 28b may be formed in the pivot plates 22a, 22b for attaching a top control arm 30 and/or a bottom control arm 32 (collectively known hereinafter as "the control arms 30, 32"), respectively, as shown in FIG. 1. The top control arm pivots 26a, 26b and/or the bottom control arm pivots 28a, 28b may form a passage 27 which may extend through the pivot plates 22a, 22b.

An end 37 of the control arms 30, 32 may have notches 35a, 35b for attaching the control arms 30, 32 to the pivot plates 22a, 22b via the top control arm pivots 26a, 26b and/or the bottom control arm pivots 28a, 28b. The notches 35a, 35b may be sized to receive the top control arm pivots 26a, 26b of and/or the bottom control arm pivots 28a, 28b of the pivot plates 22a, 22b for connecting, for attaching and/or for securing the control arms 30, 32 to the pivot plates 22a, 22b. The end 37 of the control arms 30, 32 may have passages 39 for attaching the control arms 30, 32 to the pivot plates 22a, 22b via the top control arm pivots 26a, 26b and/or the bottom control arm pivots 28a, 28b.

The top control arm pivots 26a, 26b and/or the bottom control arm pivots 28a, 28b may be inserted into the notches 35a, 35b at the end 37 of the control arms 30, 32. As a result, the top control arm pivots 26a, 26b and/or the bottom control arm pivots 28a, 28b may contact, may abut and/or may be adjacent to the notches 35a, 35b at the end 37 of the control arms 30, 32. The control arms 30, 32 may be attached to, may be fastened to and/or may be connected to the pivot plates 26a, 26b via fasteners 36, the notches 35a, 35b, the passages 39, the top control arm pivots 26a, 26b and/or the bottom control arm pivot plates 28a, 28b. The fasteners 36 may be inserted into and/or may be located inside the passages 39 of the control arm 30, 32 and the top control arm pivots 26a, 26b and/or the bottom control arm pivots 28a, 28b. As a result, the control arms 30, 32 may be attached to, may be fastened to and/or may be connected to the pivot plates 28a, 28b via the fasteners 36, the notches 35a, 35b, the passages 39, the top control arm pivots 26a, 26b and/or the bottom control arm pivots 28a, 28b. The fasteners 36 may be, for example, pins, tabs, rods, shafts, bolts, screws and/or the like. It should be understood that the fasteners 36 may be any fasteners which may attached the control arms 30, 32 to the pivot plates 26a, 26b as known to one of ordinary skill in the art.

The control arms 30, 32 may pivot and/or may rotate in a clockwise direction or in a counter clockwise direction with respect to the housing 18. The control arms 30, 32 may pivot and/or may rotate to an angle, such as, for example, a right angle and/or an acute angle with respect to the top control arm pivots 26a, 26b and/or the bottom control arm pivots 28a, 28b. It should be understood that the angle of rotation by the control arms 30, 32 may be any angle which may be equal to and/or may be less than ninety (90) degrees as known to one of ordinary skill in the art.

A bearing 38 may be attached to, may be secured to and/or may be fastened to the control arms 30, 32. The bearing 38 may be located opposite with respect to the end 37 of the control arms 30, 32. The control arms 30, 32 may have an opening 41 which may be located between the end 37 and/or the bearing 38 of the control arms 30, 32. As a result, the control arms 30, 32 may have, for example, a fork-shape. The bearing 38 may be located opposite with respect to the housing 18, the top control arm pivots 26a, 26b and/or the bottom control arm pivots 28a, 28b with the control arms 30, 32 connected to and/or attached to the pivot plates 22a, 22b. The bearing 38 may be, for example, a spherical bearing for attaching and/or for connecting the control arms 30, 32 to the knuckle 12 of the hub 14. It should be understood that the bearing 38 may be any bearing which may attach and/or may connect the control arms 30, 32 to the knuckle 12 as known to one of ordinary skill in the art.

As shown in FIG. 1, a frame 40 of the vehicle may be connected to and/or may be attached to the tube 20, the housing 18 and/or the control arms 30, 32. The frame 40 may be, for example, a ladder frame and/or the like. A first jounce limiter 42 may be attached to, may be connected to and/or may be mounted to the frame 40 for preventing the control arms 30, 32 from rotating and/or from pivoting beyond the angle with respect to the housing 18. As a result, the first jounce limiter 42 and/or the top control arm 30 may prevent and/or may stop the control arms 30, 32 from rotating beyond the angle with respect to the housing 18. The first jounce limiter 42 may be adjacent to and/or may abut the top control arm 30. A second jounce limiter 44 may be attached to, may be connected to and/or may be mounted to the top control arm 30.

The pivot plates 22a, 22b may have first rebound stops 46a, 46b which may be integrally formed with the pivot plates 22a, 22b. The first rebound stops 46a, 46b may be, for example, a planar surface and/or the like. The tube 20 may be located between the first rebound stops 46a, 46b. The second jounce limiter 44 may be adjacent to and/or may abut one of the first rebound stops 46a, 46b for preventing the control arms 30, 32 from rotating and/or from pivoting beyond the angle with respect to the housing 18. As a result, the second jounce limiter 44 and/or the first rebound stops 46a, 46b may prevent and/or may stop the control arms 30, 32 from rotating beyond the angle with respect to the housing 18.

As shown in FIG. 1, the control arms 30, 32 may be attached to, may be connected to and/or may be secured to the knuckle 12 via fasteners 48. The fasteners 48 may be, for example, pins, bolts, screws, rods, dowels, shafts and/or the like. As a result, the knuckle 12, the hub 14 and/or the tire 16 may be attached to, may be connected to and/or may be secured to the control arms 30, 32, the housing 18 and/or the tube 20. The fasteners 48 may be any fasteners which may attach the control arms 30 to the knuckle 12, the hub 14 and/or the tire 16.

Drive elements (not shown in the figures) and/or a transmission (not shown in the figures) may be located in, may be stored in and/or may be housed in the tube 20. In an embodiment, the transmission may have, for example, tube elements, power transmitting shafts and/or the like. The drive elements and/or the transmission may be connected to and/or may be attached to the housing 18 for providing energy, torque force and/or rotational force to the housing 18 via the tube 20. The housing 18 may have walls 48 which may define and/or may form an interior 50 for housing gears (not shown in the figures), such as, for example, drive gears, planetary gears and/or pinion gears to supple, to transmit, to transfer and/or to apply the energy, the torque force and/or the rotational force to the knuckle 12, the hub 14 and/or the tire 16 for driving and/or for steering the tire 16. The walls 48 may house the gears to prevent damage to the gears. The invention should not be deemed as limited to a specific embodiment of the gears.

In an embodiment, the tube 20 may have a non-circular, cross-sectional shape for housing the drive elements and/or the transmission. As a result, the non-circular, cross-sectional shape may increase a ground clearance of the vehicle and/or a strength of the vehicle. The non-circular, cross-sectional shape may reduce a resistance to motion or drag of the vehicle. The non-circular, cross-sectional shape may be, for example, oval, square, rectangular, triangular, boat-hull shaped, tapered, non-symmetrical and/or the like. The present invention should not be deemed as limited to a specific embodiment of the non-circular, cross-sectional shape of the tube 20.

A half shaft 50 and a joint 52 may connect, may attach and/or may secure the hub 14 and/or the tire 16 to the housing 18, the gears of the housing 18, the drive elements of the tube 20 and/or the transmission of the tube 20 for driving and/or for steering the hub 14 and/or the tire 16. The hub 14 and/or the tire 16 may drive and/or may steer in a first direction 54 or in a second direction 56 via the drive elements, the transmission, the gears and/or the half shaft 50 and/or the joint 52 as illustrated in FIG. 2. The joint 52 may be, for example, constant velocity joint, a homokinetic joint, a Cardan-Hooke joint, a Tribot joint and/or the like. In an embodiment, the joint 52 may be, for example, a angular power transmission element and/or the like. In an embodiment, the joint 52 may be, for example, two or more Cardan Hooke joints, two or more angular joints, mating splined shafts and/or the like. The present invention should not be deemed as limited to a specific embodiment of the joint 52 of the dual control arm suspension 10.

The vehicle may drive, may move and/or may steer from the energy, the torque force and/or the rotational force delivered to and/or transferred to the tire 16 via the half shaft 50, the drive elements and/or the transmission. The half shaft 50, the joint 52, the hub 14 and/or the tire 16 may experience, may encounter and/or may undergo an expansion and/or a compression as the vehicle drives, steers and/or moves from the energy, the torque force and/or the rotational force from the drive elements and/or from the transmission. The joint 52 may accommodate, may absorb and/or may stabilize the half shaft 50 from the expansion and/or from the compression.

FIG. 2 illustrates a frame 100 of the vehicle in an embodiment of the present invention. In an embodiment, the frame 100 may, for example, a ladder frame, a straight frame and/or an articulated frame which may have the differential housings 118a, 118b, 118c (hereinafter "the housings 118a, 118b, 118c") connected to and/or attached to the tube 20 along the frame 100 of the vehicle for driving, for moving and/or for steering the vehicle. An articulation joint (not shown in the figures) may be located between the housings 118a, 118b, 118c with the articulated frame of the vehicle. In an embodiment, the housings 118a, 118b, 118c may be axially mounted and/or axially fixed to the tube 20. The tube 20 may be located between, may connect and/or may be fixed between each of the housings 118a, 118b, 118c.

Each of the housings 118a, 118b, 118c may provide first dual control arms 120a, 120b, 120c which may be attachable to first tires 122a, 122b, 122c for driving and/or for steering the vehicle in the first direction 54 and/or in the second direction 56. Each of the housings 118a, 118b, 118c may provide second dual control arms 124a, 124b, 124c which may be attachable to second tires 126a, 126b, 126c for driving and/or for steering the vehicle. In an embodiment, the tube 20, the housings 118a, 118b, 118c, the first control arms 122a, 122b, 122c and/or the second control arms 126a, 126b, 126c may form a tubular frame independent suspension design.

In an embodiment, the tube 20 which may be located between the housing 118a and the housing 118b may have a length 150 as shown in FIG. 2. The tube 20 which may be located between the housing 118b and the housing 118c may have a length 152. The length 150 may be greater than, may be less than or may be equal to the length 152. The length 150 and the length 152 may form a wheelbase (not shown in the figures) of the frame 100 of the vehicle. The length 150 and/or the length 152 may be changed and/or may be adjusted to change a configuration and/or the wheelbase of the frame 100.

Each of the first tires 122a, 122b, 122c may have a first axis 128 which may be located at a center of each of the first tires 122a, 122b, 122c and/or each of the first dual control arms 120a, 120b, 120c. Each of the first tires 122a, 122b, 122c may have a first tire contact patch 130, as illustrated in FIG. 2. Each of the second tires 126a, 126b, 126c may have a second axis 132 which may be located at a center of each of the second tires 126a, 126b, 126c and/or each of the second dual control arms 124a, 124b, 124c. The first axis 128 and/or the second axis 132 may be, for example, a single reduction unit or may be a double reduction unit. The first axis 128 may be offset by an offset distance 134 from the second axis 132 for driving, for steering and/or for stabilizing the vehicle.

Each of the second tires 126a, 126b, 126c may have a second tire contact patch 132 which may be offset with respect to the first tire contact patch 130 based on the offset distance 134. As a result, a tire contact patch orientation of the first tires 122a, 122b, 122c and/or the second tires 126a, 126b, 126c may be asymmetrical based on the offset distance 134. The half shaft 50 and/or the joint 52 may attach and/or may connect the first tires 122a, 122b, 122c and/or the second tires 126a, 126b, 126c to the housings 118a, 118b, 118c, respectively, for driving and/or for steering the frame 100 of the vehicle in the first direction 54 and/or in the second direction 56. The offset distance 134 may be any distance which may stabilize the vehicle as known to one of ordinary skill in the art.

The drive elements and/or the transmission inside the tube 20 may drive and/or may steer the first tires 122a, 122b, 122c and/or the second tires 126a, 126b, 126c of the frame 100 of the vehicle. Each of the housing 118a, 118b, 118c may have the walls 48 to store, to enclose, to house and/or to protect the gears which may be connectable to the drive elements and/or the transmission. Each of the housings 118a, 118b, 118c may have, may contain and/or may store the gears (not shown in the figures) for connecting to the drive elements and/or the transmission of the tube 20 for driving and/or for steering the first tires 122a, 122b, 122c and/or the second tires 126a, 126b, 126c of the frame 100 of the vehicle. The drive elements, the transmission, the gears, the axis 128, the half shaft 50 and/or the joint 52 may drive, may move and/or may steer each of the first tires 122a, 122b, 122c and/or each of the second tires 126a, 126b, 126c in the first direction 54 and/or in the second direction 56 via the housings 118a, 118b, 118c. As a result, the frame 100 of the vehicle may move, may drive and/or may steer in the first direction 54 and/or in the second direction 56.

Figure 4:
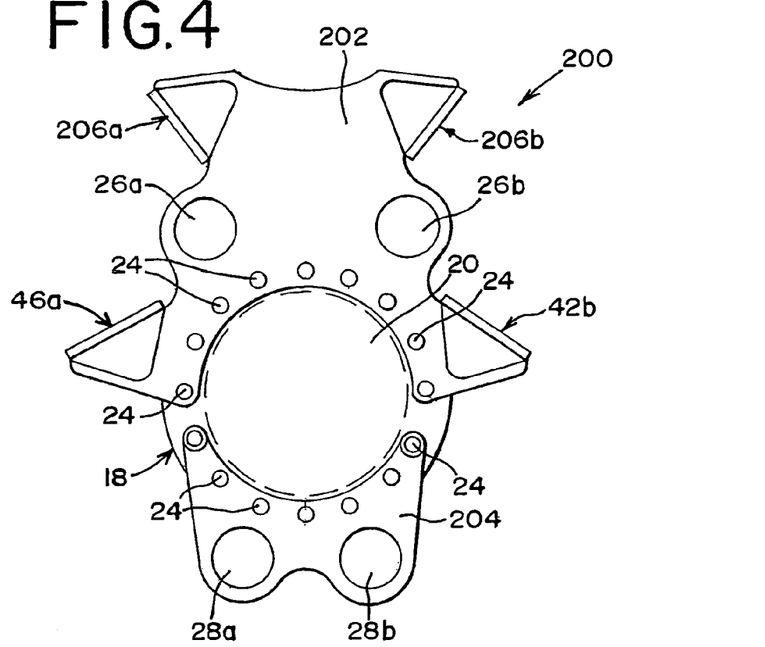
FIG. 4 illustrates a front plan view of an adapter plate in an embodiment of the present invention.
Figure 5:
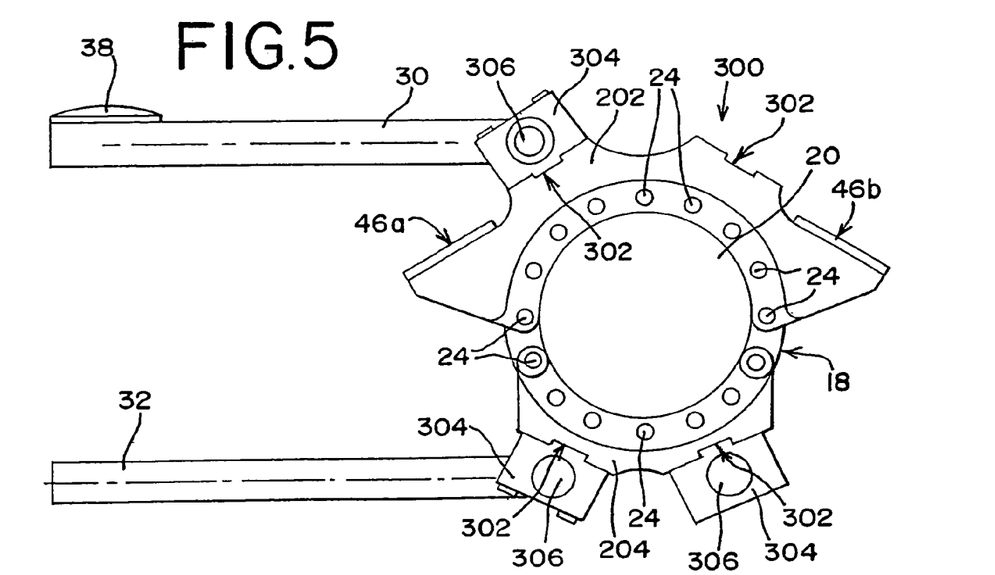
FIG. 5 illustrates a front plan view of an adapter plate in an embodiment of the present invention.
Figure 6:
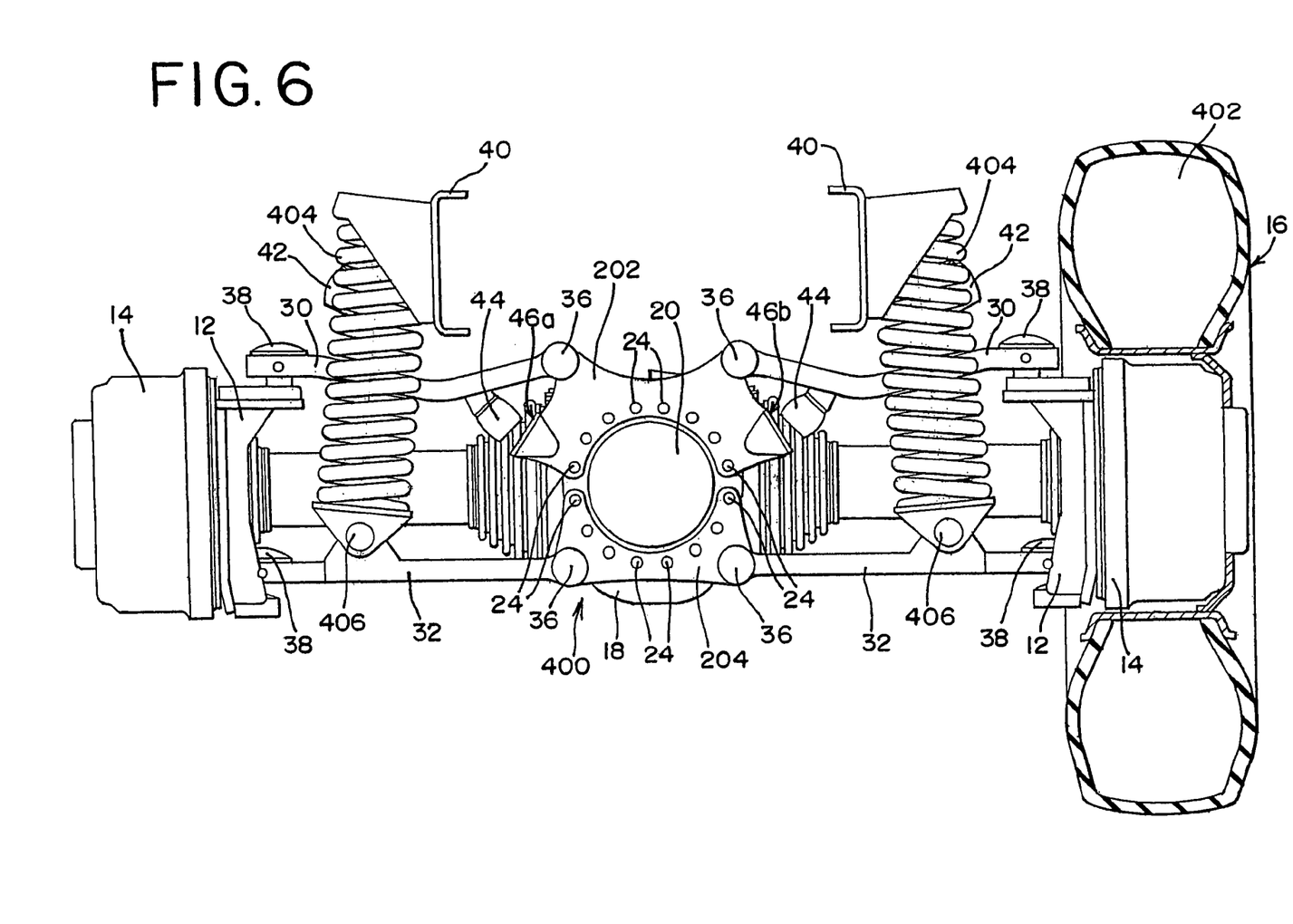
FIG. 6 illustrates a front plan view of a dual control arm independent suspension attachable to a hub and a tire in an embodiment of the present invention.

FIGS. 4-6 illustrate a first adapter plate 200, a second adapter plate 300 and/or a third adapter plate 400, respectively, for attaching, for connecting and/or for securing the control arms 30, 32 to the housing 18 and/or the tube 20 in an embodiment of the present invention. The first adapter plate 200, the second adapter plate 300 and/or the third adapter plate 400 (collectively known hereinafter as "the adapter plates 200, 300, 400"), the housing 18 and/or the tube 20 may move, may steer and/or may drive the vehicle in the first direction 54 and/or in the second direction 56 via the first tires 122a, 122b, 122c and/or the second tires 126a, 126b, 126c. Each of the adapter plates 200, 300, 400 may have and/or may provide a first part 202 and a second part 204 for attaching to, for connecting to and/or for securing to the housing 18 via the fasteners 24. As a result, the first part 202 and/or the second part 204 may be mounted to, may be attached to and/or may be secured to the housing 18 and/or the tube 20 via the fasteners 24 for driving and/or for steering the vehicle in the first direction 54 and/or in the second direction 56.

As illustrated in FIGS. 4 and 6, the first part 202 of the adapter plate 200 and/or the adapter plate 400 (collectively known hereinafter as "the adapter plates 200, 400") may have and/or may provide the top control arm pivots 26a, 26b for attaching, for connecting and/or for securing the top control arm 30 to the adapter plates 200, 400. The second part 204 of the adapter plates 200, 400 may have and/or may provide the bottom control arm pivots 28a, 28b for attaching, for connecting and/or for securing the bottom control arm 32 to the adapter plates 200, 400. The top control arm 30 may be connected to, may be attached to and/or may be secured to the first part 202 of the adapter plates 200, 400 via the fasteners 36 and/or the top control arm pivots 26a, 26b. The bottom control arm 32 may be connected to, may be attached to and/or may be secured to the second part 204 of the adapter plates 200, 400 via the fasteners 36 and/or the bottom control arm pivots 26a, 26b. The first part 202 of the adapter plates 200, 300, 400 may have and/or may provide the first rebound stops 46a, 46b for contacting and/or for abutting the second jounce limiter 44 of the top control arm 30 as shown in FIG. 6. The tube 20 may be located and/or may be positioned between the first rebound stops 46a, 46b of the adapter plates 200, 300, 400. The second jounce limiter 42 of the frame 40 may contact and/or may abut the first rebound stops 46a, 46b with the top control arms 30, 32, the hub 14, the first tires 122a, 122b, 122c and/or the second tires 126a, 126b, 126c which may be moving downwardly with respect to the frame 40.

The first part 202 of the adapter plate 200 may have second rebound stops 206a, 206b for contacting and/or for abutting the first jounce limiter 42 of the frame 40. The top control arm pivots 26a, 26b may be located between the first rebound stops 46a, 46b and the second rebound stops 206a, 206b, respectively. The first jounce limiter 42 may contact and/or may abut the second rebound stops 206a, 206b with the control arms 30, 32, the hub 14, the first tires 122a, 122b, 122c and/or the second tires 126a, 126b, 126c.

As shown in FIG. 5, the first part 202 and/or the second part 204 of the adapter plate 300 may have grooves 302 for connecting the control arms 30, 32 to the adapter plate 300, the housing 18 and/or the tube 20 in an embodiment of the present invention. A suspension management bracket 304 may be inserted into, may be located in and/or may abut one of the grooves 302 of the first part 202 and/or the second part 204 of the adapter plate 300. A fastener 306 may be inserted into and/or may engage the suspension management bracket 304 for connecting, for attaching and/or for securing the suspension management bracket 304 to one of the grooves 302 of the first part 202 and/or of the second part 204 of the adapter plate 300. As a result, the suspension management bracket 304 may be attached to and/or may be secured to the adapter plate 300 via the fastener 306 and/or the grooves 302. The fastener 306 may be, for example, a bolt, a pin, a screw, a rod, a shaft, a dowel and/or the like. It should be understood that the fastener 306 may be any fastener which may secure the suspension management bracket 304 to the adapter plate 300 as known to one of ordinary skill in the art.

The end 37 of the control arms 30, 32 may contact and/or may abut the first part 202 and/or the second part 204 of the adapter plate 300. The fastener 306 may be inserted into the end of the control arms 30, 32 for connecting the control arms 30, 32 to the suspension management bracket 304 of the adapter plate 300. The control arms 30, 32 may be attached to, may be connected to and/or may be secured to the first part 202 and/or the second part 204 of the adapter plate 300 via the suspension management bracket 304 and/or the fastener 306.

As a result, the control arms 30, 32 may be attached to, may be connected to, and/or may be secured to the housing 18 and/or the tube 20 via the first part 202 and/or the second part 204 of the adapter plate 300.

In an embodiment, one of the adapter plates 200, 300, 400 may be attached to and/or may be connected to the housing 18 and/or the tube 20 via the fasteners 24. The control arms 30, 32 may connect the knuckle 12, the hub 14 and/or the tire 16 to the housing 18, the tube 20 and/or the adapter plate 400 as shown in FIG. 6. The control arms 30, 32 may be attached to and/or may be secured to the knuckle 12 via the bearing 38. The control arms 30, 32 may be curved, may be planar and/or may be non-planar. The drive elements and/or the transmission inside the tube 20 may be connected to the hub 14 and/or the tire 16 via the half shaft 50 and/or the gears inside the housing 18. The drive elements and/or the transmission may drive, may steer and/or may move the tire 16 via the half shaft 50 and/or the gears inside the housing 18. As a result, the tire 16 and/or the vehicle may drive, may steer and/or may move in the first direction 54 and/or in the second direction 56.

The tire 16 may have a compartment 402 which may be filled with, for example, compressed air and/or the like. As the vehicle may drive, may steer and/or may move in the first direction 54 and/or in the second direction 56, the compartment 402 may absorb and/or may dampen energy and/or vibrations which may be caused from a terrain (not shown in the figures) and/or the like. The terrain may be, for example, soft soils, mud, sand, snow, water and/or the like. As a result, the compartment 402 may stabilize the housing 18 and/or the tube 20 as the vehicle may drive, may steer and/or may move over the terrain. The present invention should not be deemed as limited to a specific embodiment of the terrain which may be contacted and/or may be engaged by the tire 16 of the vehicle.

The frame 40 may be attached to and/or may be connected to the bottom control arm 32 via a spring element 404 as shown in FIG. 6. A fastener 406 may connect, may attach and/or may secure the springs 404 to the bottom arm 32, the adapter plate 400, the housing 18 and/or the tube 20. The fastener 406 may be, for example, a pin, a dowel, a shaft, a rod, a bolt and/or the like. It should be understood that the fastener 406 may be any fastener which may attach the spring element 404 to the bottom control arms 32.

The spring element 404 may be a single spring element or multiple spring elements which may be in parallel or in series with respect to each other. The spring element 404 may be, for example, a hydropneumatic strut, an air spring, a torsion bar, a leaf spring, a pivoted leaf spring, an air bag; opposing permanent magnets, opposing electromagnets and/or a linear electric motor. Further, the spring element 404 may be, for example, a hydraulic cylinder, an air cylinder, an elastomeric spring, a rubber block, a compressible fluid device, an active suspension element and/or the like. The present invention should not be deemed as limited to a specific embodiment of the spring element 404.

In an embodiment, an upper body (not shown in the figures) may be attached to, may be mounted to and/or may be connected to the frame 40. The upper body may be, for example, a cab, a passenger compartment, a cargo compartment, a control cabin and/or the like. The spring element 404 may absorb and/or may dampen energy and/or vibrations which may be caused from driving, from steering and/or from moving the frame 40 over the terrain. The spring element 404 and/or the compartment 402 of the tire 16 may stabilize the frame 40 and/or the upper body of the vehicle. The present invention should not be deemed as limited to a specific embodiment of the upper body of the vehicle.

In an embodiment, the top control arm pivots 26a, 26b of the pivot plates 22a, 22b may permit and/or may allow a first control arm geometry of the top control arm 30 with respect to the tube 20, the housing 18 and/or the pivot plates 22a, 22b. The bottom control arm pivots 28a, 28b may permit a second control arm geometry of the bottom control arm 32 with respect to the tube 20, the housing 18 and/or the pivot plates 22a, 22b. In an embodiment, the top control arm pivots 26a, 26b and/or the bottom control arm pivots 28a, 28b may be integral to the housing 18.

The first jounce limiter 42 and/or the second jounce limiter 44 (collectively known hereinafter as "the jounce limiters 42, 44") may be located between the second rebound stoppers 206a, 206b and/or the first rebound stoppers 46a, 46b, respectively, to support the frame 40 and/or the upper body of the vehicle. In an embodiment, the jounce limiters 42, 44 may be connected to, may be attached to and/or may be secured to a space-frame (not shown in the figures) for supporting the frame 40 and/or the upper body of the vehicle.

In an embodiment, wheel positions of the first wheels 122a, 122b, 122c and/or the second wheels 126a, 126b, 126c of the frame 100 may be based on, may correspond to and/or may be associated with the offset distance 134 and the first axis 128 and/or the second axis 132, respectively, as shown in FIG. 2. The wheel positions of the first wheels 122a, 122b, 122c may be offset or may be aligned with respect to the wheel positions of the second walls 126a, 126b along the frame 100.

In an embodiment, the housing 18 and one of the adapter plates 200, 300, 400 may form and/or may be generally referred to as a swing-arm suspension retrofit as shown in FIGS. 4-6. The top control arm pivots 26a, 26b of the adapter plates 200, 300, 400 may permit and/or may allow the first control arm geometry of the top control arm 30 with respect to the tube 20, the housing 18 and/or the adapter plates 200, 300, 400. The bottom control arm pivots 28a, 28b of the adapter plates 200, 300, 400 may permit and/or may allow the second control arm geometry of the bottom control arm 32 with respect to the tube 20, the housing 18 and/or the adapter plates 200, 300, 400.

In an embodiment, the drive elements, the transmission, the tube 20, the frame 100 and/or the dual control arm suspension 10 may drive or may not drive and/or may steer and/or may not steer the tire 16, the first tires 122a, 122b, 122c and/or the second tires 126a, 126b, 126c. The control arms 30, 32 may pivot at the top control arm pivots 26a, 26b and/or the bottom control arm pivots 28a, 28b of the housing 18 for absorbing and/or for dampening the energy and/or the vibrations which may be caused by driving, by steering and/or by moving the vehicle over the terrain. The wheel positions of the first tires 122a, 122b, 122c and/or the second tires 126a, 126b, 126c may be offset by and/or may be staggered by the offset distance 134 to minimize or to de-couple a reaction of the dual control arm suspension 10 from simultaneous excitement, from near-simultaneous excitement and/or from resonance which may be caused by the energy and/or by the vibrations from engaging the terrain.

The adapter plates 200, 300, 400 may be retrofitted and/or may be manufactured to be mounted and/or to be attached to the housing 18 and/or the housings 118a, 118b, 118c. As a result, the dual control arm suspension 10 may be utilized with and/or may be incorporated with the drive elements and/or transmission within the tube 20. The length 150 and/or the length 152 may be adjusted and/or may be changed to alter and/or to change the configuration of the vehicle and/or of the frame 100. One or more of the housings 118a, 118b, 118c may be added or may be removed to alter and/or to change the configuration of the vehicle and/or of the frame 100. As a result, the wheelbase of the frame 100 may be altered and/or may be changed based on the terrain which may be engaged by the vehicle.

The dual control arm suspension 10 may provide a high wheel travel, a low resonant frequency, a near-vertical wheel travel and/or a low spring rate. As a result, a wheel to terrain compliance may be improved to minimize the energy and/or the vibrations induced into the frame 100, the frame 40 and/or the upper body of the vehicle. The dual control arm suspension 10 may provide integral positive travel stops or external positive travel stops between the first jounce limiter 42 and/or the second jounce limiter 44 and the first rebound stoppers 46a, 46b and/or the second rebound stoppers 206a, 206b. As a result, the dual control arm suspension 10 may avoid and/or may prevent over-extension and/or compression of the half shaft 50, the springs 404, the joint 52 and/or the control arms 30, 32. Further, the dual control arm suspension 10 may permit the vehicle to be suspended and/or to be compressed downward for preventing damage to the dual control arm suspension 10.

The dual control arm suspension 10 may be integrated with a control device (not shown in the figures) for dampening and/or for absorbing the energy and/or the vibrations which may be caused from engaging the terrain. The control device may be, for example, a dampener device, a roll control, an oil-filled shock absorber, a gas-filled shock absorber, an anti-roll bar, an active suspension element, a semi-active dampening device, an active dampening element, an operator controlled dampening device, a magnetorheological device, an electrorheological device, an elastomeric dampener and/or the like. The present invention should not be deemed as limited to a specific embodiment of the control device which may be integrated with the dual control arm suspension 10.

In an embodiment, the dual control arm suspension 10, the first control arm geometry and/or the second control arm geometry may permit the tire 16, the first tires 122a, 122b, 122c and/or the second tires 126a, 126b, 126c to achieve and/or to maintain planar ground contact with near-vertical wheel travel via the dual control arm suspension 10. The dual control arm suspension 10, the first control arm geometry and/or the second control arm geometry may increase a roll stiffness of the frame 100 and/or of the vehicle and/or an available wheel travel. The dual control arm suspension 10, the first control arm geometry and/or the second control arm geometry may reduce a load sensitivity and/or a ride height of the vehicle, a wheel camber change of the vehicle, a track-width change, a sensitivity to bump steering in the vehicle, a tire wear due to scuffing for the vehicle and/or a susceptibility to traction hip of the vehicle.

In an embodiment, the dual control arm suspension 10 may be accompanied and/or may be incorporated with another suspension type and/or with unsuspended axles. The dual control arm suspension 10, the first control arm geometry and/or the second control arm geometry may increase flexibility of the drive elements and/or the transmission by increasing available width of the vehicle without interference with the frame 100. As a result, the drive elements and/or the transmission may be larger and/or more powerful than the vehicle without the dual control arm suspension 10. The dual control arm suspension 10, the first control arm geometry and/or the second control arm geometry may provide and/or may allow a lower vehicle body, a lower center of gravity, a lower vehicle height than the vehicle without the dual control arm suspension 10. As a result, the vehicle may increase stability with the lower center of gravity and/or vertical clearance with the lower vehicle height than the vehicle without the dual control arm suspension 10.

In an embodiment, the dual control arm suspension 10 and/or the tube 20 may increase a length of the first control arm geometry and/or of the second control arm geometry of the vehicle. As a result, the vehicle may provide nearly vertical wheel travel, a reduced track-width change, a reduced change in camber angle and/or a reduced sensitivity to bump steering than the vehicle without the dual control arm suspension 10 and/or the tube 20. The dual control arm suspension 10 and/or the tube 20 may provide for fluid exchange inside the tube 20 to serve as a reservoir for fluids, such as, for example, hydraulic fluids, lubricating oils and/or the like. The present invention should not be deemed as limited to a specific embodiment of the fluids inside the tube 20.

In an embodiment, the dual control arm suspension 10 and/or the tube 20 may increase available wheel travel for the vehicle and/or available steering camber angle than the vehicle without the dual control arm suspension 10. The dual control arm suspension 10 and/or the tube 20 may reduce a weight associated with the frame 100 of the vehicle with respect to a weight of the frame 100 without the dual control arm suspension 10. The dual control arm suspension 10 and/or the tube 20 may prevent damage to the drive elements and/or the transmission inside the tube 20 from, for example, a mine blast, direct weapons fire and/or indirect weapons fire.

The dual control arm suspension 10 may provide the control arms 30, 32 which may simultaneously pivot with respect to the housing 18. The control arms 30, 32 may be mounted to the tube 20, the housing 18 and/or the knuckle 12. The control arms 30, 32 may be offset by the distance 134 along a wheelbase of the frame 100 for minimizing and/or for decoupling the dual control arm suspension reaction from the simultaneous excitement, the near-simultaneous excitement and/or the resonance. The vehicle and/or the frame 100 may be manufactured with and/or may be retrofitted to receive the dual control arm suspension 10 via the adapter plates 200, 300, 400, the top control arm pivots 26a, 26b and the bottom control arm pivots 28a, 28b. The frame 100 may receive and/or may attach to the housings 118a, 118b, 118c for modifying the configuration of the vehicle and/or for mounting the dual control arm suspension 10 to the independent suspension vehicle.

It should be understood that various changes and modifications to the presently preferred embodiments described herein will be apparent to those skilled in the art. Such changes and modifications may be made without departing from the spirit and scope of the present invention and without diminishing its attendant advantages.

I claim:

1. A dual control arm suspension for moving a first tire and a second tire wherein the first tire has a first axis wherein the second tire has a second axis wherein drive elements are connected to the first tire and the second tire wherein the drive elements rotate the first tire and the second tire, the dual control arm suspension comprising:

a housing having a length defined between a first end and a second end wherein the housing has walls defining an interior wherein the first axis of the first tire is offset a distance along the length of the housing with respect to the second axis of the second tire wherein the housing is positioned between the first tire and the second tire;

a first plate having a width defined between a first side and a second side wherein the first plate is connected to the first end of the housing wherein the first plate has a pivot which extends outwardly with respect to the walls of the housing wherein a passage is formed in the pivot of the first plate wherein the passage extends from the first side through the first plate to the second side of the first plate;

a first arm having a length defined between a first end and a second end wherein the pivot of the first plate is inserted into the first end of the first arm wherein the first arm is connected to the first plate wherein the first arm is connected to the first tire;

a shaft connected to the housing wherein the shaft extends from the interior of the housing outwardly with respect to the second end of the first arm wherein the shaft rotates the first tire wherein the first arm rotates with respect to the housing via the pivot;

a second plate connected to the second end of the housing wherein the first arm is connected to the second plate; and a second arm substantially similar in size and shape to the first arm wherein the second arm is connected to the first plate, the second plate and the second tire.

2. The dual control arm suspension of claim 1 further comprising:

a bearing connected to the second end of the first arm wherein the bearing connects the first arm to the first tire.

3. The dual control arm suspension of claim 1 further comprising:

a tube connected to the housing wherein the drive elements provide energy via the tube to move the first tire.

4. The dual control arm suspension of claim 1 further comprising:

a joint attached to the shaft wherein the joint connects the shaft to the first tire.

5. The dual control arm suspension of claim 1 further comprising:

a third arm attached to first plate wherein the third arm connects the first plate and the first tire.

6. The dual control arm suspension of claim 1 wherein the first arm is fork-shaped.

7. The dual control arm suspension of claim 1 further comprising:

means for rotatably connecting the first arm and the second arm to the second plate.

8. The dual control arm suspension of claim 1 further comprising:

a stopper formed on the first plate wherein the stopper prevents the first arm from rotating with respect to the housing.

9. A frame for moving a vehicle wherein a transmission is connected to the frame for moving the vehicle, the frame comprising:

a first tire having a first axis wherein a hub is located within the first tire;

a first dual control arm suspension connected to the hub of the first tire wherein the first dual control arm suspension has a first arm and a second arm that suspend the first tire;

a first differential housing having a length defined between a first end and a second end wherein the first differential housing has walls defining an interior wherein the first differential housing has a transverse axis that intersects the first differential housing along the length of the first differential housing wherein the first dual control arm suspension is connected to the first end and the second end of the first differential housing wherein a first torgue force is transmitted via the first differential housing to the first tire to rotate the first tire;

a second tire connected to the first differential housing wherein the second tire has a second axis;

a second dual control arm suspension having a third arm and a fourth arm that suspend the second tire wherein the third arm is substantially similar in size and shape to the first arm of the first dual control arm suspension and further wherein the fourth arm is substantially similar in size and shape to the second arm of the first dual control arm suspension; and an offset between the first tire and the second tire that is symmetrical about the transverse axis of the first differential housing wherein the offset is defined by a first distance between the first axis and the second axis wherein the first dual control arm suspension suspends the first tire at a second distance from the transverse axis of the first differential housing and further wherein the second dual control arm suspension suspends the second tire at a third distance from the transverse axis.

10. The frame of claim 9 further comprising:
a plate connected to the first end or the second end of the differential housing wherein the plate is located between the first dual control arm suspension and the first differential housing.

11. The frame of claim 9 wherein the second dual control arm suspension is connected to the first end and the second end of the first differential housing.

12. The frame of claim 9 further comprising:
a second differential housing connected to the first differential housing wherein the torque force is transmitted via the first differential housing and the second differential housing to the first tire to rotate the first tire.

13. The frame of claim 12 further comprising:
a tube extending between the first differential housing and the second differential housing wherein the tube is connected to the interior of the first differential housing and to the second differential housing wherein the torque force is transmitted via the first differential housing, the tube, and the second differential housing to the first tire to rotate the first tire.

14. The frame of claim 9 further comprising:
shafts connected to the first differential housing wherein each of the shafts are offset by the distance between the first axis of the first tire and the second axis of the second tire.

15. A modular retrofit suspension system for connecting a dual control arm suspension to a frame of a vehicle for driving the vehicle over a terrain, the retrofit suspension system comprising:
a housing having a length defined between a first end and a second end wherein the housing has walls defining an interior wherein the housing has a first shaft and a second shaft extending from the interior of the housing outwardly with respect to the walls of the housing wherein the first shaft is offset a distance with respect to the second shaft;

a first plate connected to the first end of the housing wherein the first plate is situated parallel to a transverse cross-section of the housing wherein the first plate has a width defined between a first side and a second side;

a first passage formed in the first plate wherein the first passage extends from the first side through the first plate to the second side of the first plate;

a second plate connected to the second end of the housing wherein the second elate is situated parallel to the first plate;

a first dual control arm suspension having a first arm and a second arm both connected to the first plate and the second plate wherein the first arm is connected to the first plate via the first passage of the first plate wherein the first arm rotates to a first angle with respect to the housing wherein the first dual control arm suspension reduces a vibration in the frame of the vehicle caused by driving the vehicle over the terrain; and a first stopper integrally formed with the first plate wherein the first stopper prevents the first arm from rotating to a second angle greater than the first angle with respect to the housing.

16. The modular retrofit suspension system of claim 15 further comprising:
a second passage formed in the second plate wherein the first arm is connected to the second plate via the second passage.

17. The modular retrofit suspension system of claim 15 wherein the second plate is substantially similar in size and shape to the first plate.

18. The modular retrofit suspension system of claim 15 further comprising:
a second dual control arm suspension connected to the first elate and the second plate wherein the second dual control arm suspension reduces the vibration in the frame of the vehicle caused by driving the vehicle over the terrain.

19. The modular retrofit suspension system of claim 15 further comprising:
a spring connected to the first dual control arm suspension wherein the spring reduces the vibration caused by driving the vehicle over the terrain.

20. The modular retrofit suspension system of claim 15 further comprising:
a second stopper connected to the frame wherein the second stopper restricts rotation of the first arm.

* * * * *